(12) United States Patent
Ramsden et al.

(10) Patent No.: US 9,268,044 B2
(45) Date of Patent: Feb. 23, 2016

(54) NEUTRON SPECTROMETER (75) Inventors: David Ramsden, Southampton (GB);
Calvin Giles, Southampton (GB)

(73) Assignee: Symetrica Limited (GB)

( * ) Notice: Subject to any disclaimer, the term of this patent is extended or adjusted under 35 U.S.C. 154(b) by 94 days.

(21) Appl. No.: 14/114,661

(22) PCT Filed: May 2, 2012

(86) PCT No.: PCT/GB2012/050957
§ 371 (c)(1),
(2), (4) Date: Feb. 18, 2014

(87) PCT Pub. No.: WO2012/150451
PCT Pub. Date: Nov. 8, 2012

(65) Prior Publication Data
US 2014/0151566 A1 Jun. 5, 2014

(30) Foreign Application Priority Data

May 4, 2011 (GB) .................................. 1107357.4

(51) Int. Cl.
*G01T 1/20* (2006.01)
*G01T 3/00* (2006.01)
G01T 3/06 (2006.01)
*G01V 5/00* (2006.01)

(52) U.S. Cl.
CPC . *G01T 3/001* (2013.01); *G01T 3/06* (2013.01); *G01V 5/0091* (2013.01)

(58) Field of Classification Search
CPC ......... G01T 3/001; G01T 3/06; G01V 5/0091
USPC ....................................................... 250/366
See application file for complete search history.

(56) References Cited

U.S. PATENT DOCUMENTS 7,244,947 B2 * 7/2007 Polichar et al. .......... 250/390.01
8,796,636 B2 * 8/2014 Kline et al. .............. 250/390.11
(Continued)

FOREIGN PATENT DOCUMENTS

EP 1749220 2/2007
EP 2019974 8/2013

OTHER PUBLICATIONS

Saint-Gobain Crystals, inc., "Organic Scintilation Materials: Its what's Inside that Counts", retrieved from www.crystals.saint-gobain.com Mar. 31, 2015.*

(Continued)

*Primary Examiner* — David Porta
*Assistant Examiner* — Edwin Gunberg
(74) *Attorney, Agent, or Firm* — Fitzsimmons IP Law (57) ABSTRACT

A neutron spectrometer is described. The spectrometer includes a first conversion screen (8) comprising a neutron absorbing material and a phosphor material, a first wavelength-shifting light-guide (14) arranged to receive photons from the phosphor material of the first conversion screen and generate wavelength-shifted photons therefrom and a first photodetector (22) optically coupled to the first wavelength-shifting light-guide and arranged to detect the wave-length-shifted photons. The spectrometer further includes a second conversion screen (12) comprising a neutron absorbing material and a phosphor material, a second wavelength-shifting light-guide (16) arranged to receive photons from the phosphor material of the second conversion screen and generate wavelength-shifted photons there-from, and a second photodetector (24) optically coupled to the second wavelength-shifting light-guide and arranged to detect the wave-length-shifted photons. A neutron moderator material is arranged between the first and second conversion screens to moderate neutrons.

10 Claims, 5 Drawing Sheets

(56) References Cited

U.S. PATENT DOCUMENTS

2007/0272874 A1 11/2007 Grodzins
2010/0224783 A1 9/2010 Frank
2010/0276602 A1 11/2010 Clothier et al.
2010/0294415 A1 11/2010 Frank
2011/0266643 A1* 11/2011 Engelmann et al. .......... 257/429

OTHER PUBLICATIONS

Coded Aperture Imaging: Predicted Performance of Uniformly Redundant Arrays, E.E. Fenimore; Applied Optics / vol. 17, No. 22 / Nov. 15, 1978 / pp. 3562-3570.

Coded Aperture Imaging With Uniformly Redundant Arrays, E.E. Fenimore and T.M. Cannon; vol. 17, No. 3 / Applied Optics; Feb. 1, 1978; pp. 337-347.

A Novel Neutron Multiplicity Detector Using Lithium Fluoride and Zinc Sulphide Scintillator, John C. Barton, Christopher J. Hatton and John E. McMillan; Department of Phsics, Birkbeck College, Univ. of London; Department of Combined Studies, Univ. of Leeds and Department of Physics, Univ of Leeds; Received May 17, 1991 in Final Form Aug. 1, 1991; 0954-3899/91/121885-15 $03.50 @ 1991 IOP Publishing Ltd.; pp. 1885-1899.

* cited by examiner

FIG. 5

NEUTRON SPECTROMETER

BACKGROUND ART

The invention relates to neutron spectrometers.

One of the most challenging tasks that have been set for radiation detectors in the field of Homeland Security is the reliable detection of nuclear weapons and special nuclear materials which may be concealed in cargo crossing international borders. Whilst roughly 1 to 2% of all cargo vehicles carry innocent radioactive materials, typically one in $10^4$ of these are found to be carrying a neutron source. Neutron sources find applications for example in the oil and gas exploration industry, soil moisture gauges, materials analysis and radiography.

A neutron source may be provided by accelerating deuterium ions towards an electrode that has been loaded with tritium. Whilst such sources of neutron radiation can be controlled, other neutron sources are based on radioactive materials which can provide a significant hazard. For example, intense alpha-particle emitters such as Americium-241 or Plutonium-238 are often combined with Beryllium or Lithium metal to provide a neutron source. These sources can be intense and represent a significant hazard in their own right, particularly if they are combined with explosives to provide a so-called "dirty bomb".

Figure 5:
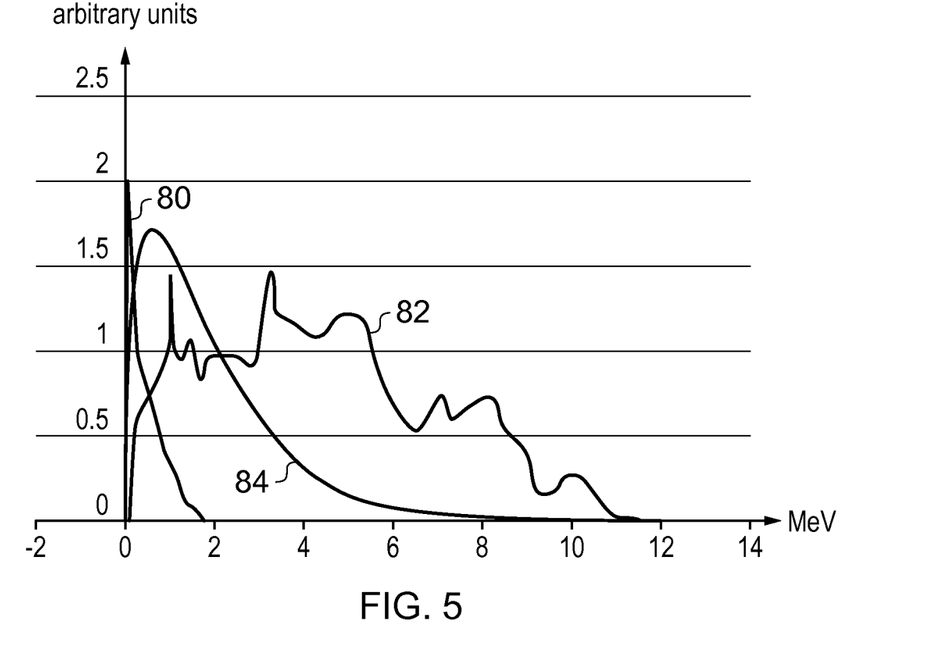
FIG. 5 schematically shows neutron spectra for Americium-241 combined with Lithium (AmLi), Plutonium-238 combined with Beryllium (PuBe) and Californium-252.

FIG. 5 of the accompanying drawings schematically shows neutron spectra produced by various neutron sources. The graph shown in FIG. 5 is a plot of the number of neutrons counted in arbitrary units against energy in MeV. The neutron spectra for an intense alpha-particle emitter of Americium-241 combined with Lithium (AmLi) and Plutonium-238 combined with Beryllium (PuBe) are shown in FIG. 5 (lines 80 and 82 respectively). The figure also illustrates a neutron spectrum generated from a neutron source generated through nuclear fission (e.g., Californium-252), as illustrated by line 84 in FIG. 5.

It is evident from FIG. 5 that each of the neutron sources can be differentiated, because the relative number of neutrons at specific energy levels differs for each source. For example the AmLi source has a high count of neutrons at low energy (e.g. less then 0.5 MeV) and no neutrons having an energy greater than 2 MeV. However, PuBe has a low neutron count at low energies (e.g. less than 1 MeV) and a spread of neutrons having an energy between 1 and 11 MeV.

SUMMARY OF THE INVENTION

According to a first aspect of the invention there is provided a neutron spectrometer. The neutron spectrometer comprises a first conversion screen comprising a neutron absorbing material and a phosphor material, a first wavelength-shifting light-guide arranged to receive photons from the phosphor material of the first conversion screen and generate wavelength-shifted photons therefrom, a first photodetector optically coupled to the first wavelength-shifting light-guide and arranged to detect the wavelength-shifted photons, a second conversion screen comprising a neutron absorbing material and a phosphor material, a second wavelength-shifting light-guide arranged to receive photons from the phosphor material of the second conversion screen and generate wavelength-shifted photons therefrom, and a second photodetector optically coupled to the second wavelength-shifting light-guide and arranged to detect the wavelength-shifted photons. The neutron spectrometer further comprises a neutron moderator material arranged between the first and second conversion screens to moderate neutrons.

The neutron spectrometer is in the form of a series of thermal-neutron detectors interleaved between a neutron moderating material in such a way that the number of events detected in each layer of thermal-neutron detector can be recorded. The number of detected events can provide the ratio of the probability that incident neutrons have thermalised at different depths in the moderating material layers, which can provide sufficient information to distinguish between common types of neutron sources.

The neutron moderator material of the neutron spectrometer may comprise the first wavelength-shifting light-guide. This allows for a spectrometer having a reduced thickness, since fewer layers can be used. Alternatively, the neutron moderator of the neutron spectrometer may be a separate layer of neutron moderator material. For example, the neutron moderator material may be a passive material such as polyethylene or a polyvinyltoluene (PVT) light-guide used to readout the conversion screens.

Each of the first and second conversion screens may comprise a substrate having the neutron absorbing material and the phosphor material in a powdered form in a binding material thereon. This provides a simple way of producing the screens.

The substrates of the first and/or second conversion screens may be translucent for wavelengths in the region of the peak emission wavelength of the phosphor material. This allows for photons to enter the first and second light-guides to be detected in the first and second photodetectors. For example, if the second conversion screen is translucent, any event that occurs in the second conversion screen may be detected by the first and second photodetector.

The first and/or second wavelength-shifting light-guides may comprise a sheet of wavelength-shifting plastic, for example generally in the form of a plank. For example, the plank may have a generally rectangular cross-section and have a length that is greater than its width, which in turn is greater than its thickness.

The first and/or second wavelength-shifting light-guide may alternatively comprise an array or ribbon of optical fibres. For example, having a number of fibres selected from the group comprising: at least 10, at least 20, at least 30, at least 40, at least 50, at least 60, at least 70, at least 80, at least 90 and at least 100. The fibres may, for example, have diameters selected from the group comprising: 0.5 mm, 1 mm, 1.5 mm, 2 mm, 2.5 mm, 3 mm, 3.5 mm, 4 mm, 4.5 mm and 5 mm.

The neutron spectrometer may comprise a layer of neutron moderating material arranged to moderate neutrons prior to interaction with the first and second conversion screens.

The conversion screens and wavelength-shifting light-guides may be in the form of adjacent planar layers.

The neutron spectrometer may comprise a third conversion screen comprising a neutron absorbing material and a phosphor material, wherein the second wavelength-shifting light-guide is arranged to receive photons from the phosphor material of the third conversion screen and generate wavelength-shifted photons therefrom. The neutron spectrometer may comprise a more than three conversion screens.

The conversion screens and wavelength-shifting light-guides may be in loose optical contact. This enables the optical photons from the phosphor material in the conversion screens to readily couple into the wavelength-shifting light-guides.

The neutron spectrometer may comprise a processor arranged to receive a first signal output from the first photodetector and a second signal output from the second photodetector and arranged to count a number of neutron events that occur in the first and second conversion screens to derive an indication of the neutron source. Each conversion screen may include a photodetector coupled to the processor to receive a respective signal. Furthermore, the processor may be arranged to determine a ratio between the number of neutron events that occur in the first and second conversion screens to obtain an indication of the neutron source from the relative number of neutron events detected in the first and second conversion screens.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1A:
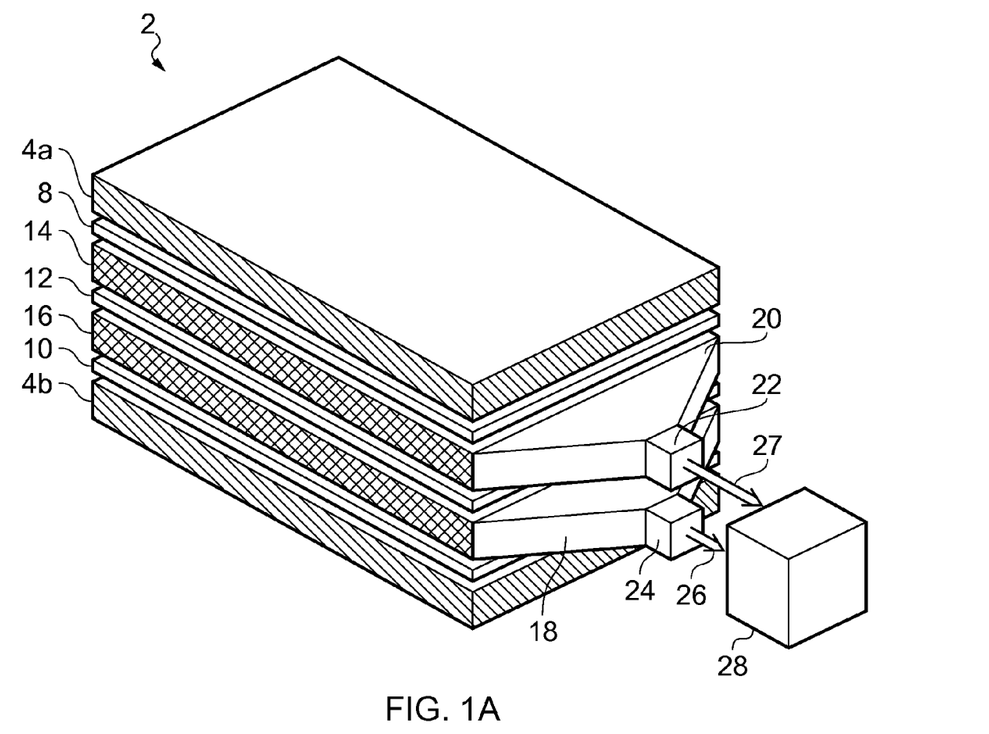
FIGS. 1A and 1B schematically show a perspective view and side view respectively of a neutron spectrometer according to an embodiment of the invention.
Figure 1B:
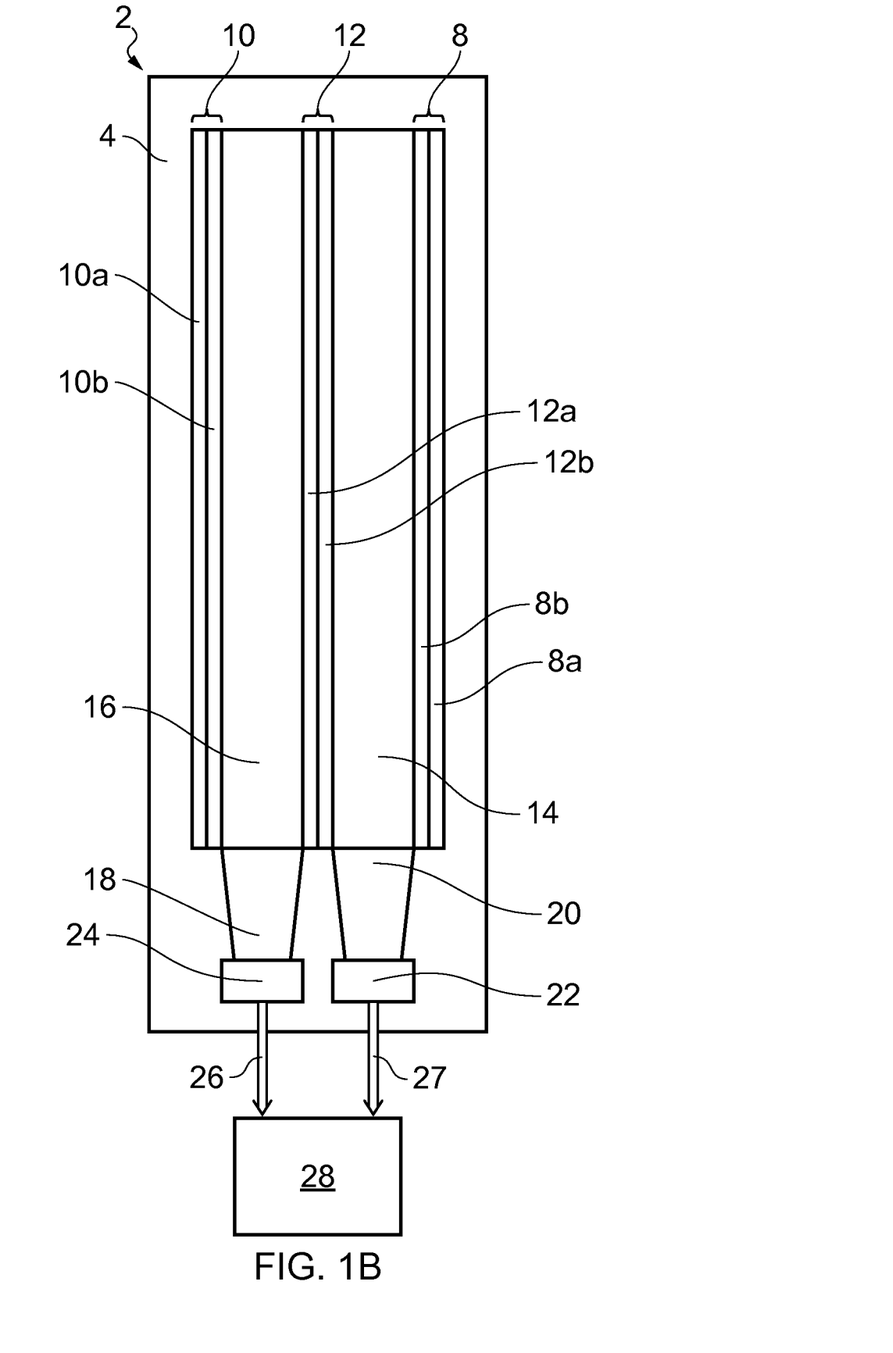

FIGS. 1A and 1B schematically show a neutron spectrometer 2 according to an embodiment of the invention in perspective and side views. The neutron detector 2 has a generally layered structure. Various layers of the detector 2 are shown separated from one another in FIG. 1A for ease of representation. In practice the different layers will generally be in contact with one another, e.g. loose optical contact.

The neutron spectrometer comprises first, second, and third neutron absorbing conversion screens 8, 12, 10. Separating the first and second conversion screens 8, 12 is a first wavelength-shifting light-guide 14 and separating the second and third conversion screens 10, 12 is a second wavelength-shifting light-guide 16. Each of the first and second wavelength-shifting light-guides 14, 16 is in the form of a plastic scintillator plank (or sheet). Thus the first wavelength-shifting light-guide 14 is flanked by the first and second conversion screens 8, 12 and, the second wavelength-shifting light-guide 16 is flanked by the second and third conversion screens 12, 10. Each of the light-guides 14, 16 are coupled to respective ones of first and second photodetectors 22, 24, e.g., silicon photomultiplier detectors, via respective conventional optical couplers 20, 18, e.g. fish-tail light guides. The conversion screens and light-guides are mounted in an optically opaque neutron moderating cover 4, e.g. comprising HDPE (high density polyethylene). In the perspective view shown in FIG. 1A, side portions of the neutron moderating cover are shown, for ease of representation, removed and revealing an upper and a lower neutron moderating layer 4a, 4b.

Output signals from the photodetectors 22, 24 (schematically shown by arrows 27, 26 respectively) are passed to a processor 28 for processing. The processor may be internal to the main detector body, or may be external.

It will be appreciated that some aspects of the figures are not drawn to scale. In this example, the spectrometer 2 is generally plank-like with an overall length of around 1.2 m (including the neutron moderating cover), a width of around 0.4 m, and a thickness of around 0.14 m. The neutron moderating cover 4 in this example might have a thickness of a few cm, e.g. perhaps in the region 1 to 5 cm, for example around 2 cm or higher, 2.5 cm or higher or 3 cm or higher. The conversion screens (defining the neutron-sensitive active area) have lengths in this example of around 1 m, widths of around 30 cm, and thicknesses of less than 2 mm or 3 mm or so, for example, less than 1 mm. The light-guides have an area broadly corresponding to that of the adjacent conversion screens. The thickness of the light-guides depends on the technology employed. For example, a light-guide based on a single slab or sheet of wavelength-shifting material as in this example might have a thickness of a few cm, e.g. perhaps in the region of 1 to 5 cm, for example around 2 cm or higher, 2.5 cm or higher or 3 cm or higher. In other examples different characteristic scales of detector may be appropriate.

In this example embodiment the first, second and third conversion screens 8, 12, 10, each comprise a respective conversion layer 8b, 12b, 10b comprising a mixture of a neutron absorbing material and a phosphor material mounted on a respective substrate 8a, 12a, 10a. The outermost, or first and third substrates 8a, 10a, each comprise an aluminium sheet with a reflective face on the side of its respective conversion layer. The reflective face may be provided by polishing the aluminium or by an intermediate coating, e.g. a diffusively reflecting white coating. The inner or second substrate 12a in this example is translucent, e.g., Mylar or Melinex. The mixture of neutron absorbing material and phosphor (luminescent) material comprises powdered forms of each which are well-mixed in a resin binder and spread onto the substrate, e.g. in a layer perhaps around 0.5 to 1 mm thick, and left to set. In this example, the neutron absorbing material comprises $^6$Li enriched LiF. The phosphor material comprises ZnS(Ag). In other examples the neutron absorbing material may be based on/include other neutron-absorbing elements, e.g. $^{10}$B. Equally, in other examples the phosphor material may be based on/include other phosphor material, e.g. using pure CsI or yttrium aluminium perovskite (YAP) in powdered/granular form.

In this example the wavelength-shifting light-guides 14, 16 each comprise a plank of wavelength-shifting plastic scintillator material, e.g. based on polyvinyltoluene (PVT) such as the EJ-280 materials available from Eljen Technology, Tex., USA. The wavelength-shifting light-guides 14, 16 may, for example, broadly follow any of the designs of the plastic scintillators described in EP 1 749 220 [1] or EP 2 019 974 [2], the contents of which relating to those designs are incorporated herein by reference.

In the embodiment shown in FIGS. 1A and 1B, the neutron moderating material used for the neutron moderating cover 4 is HDPE. However, in alternative embodiments other materials might be used, for example, PVT.

The first and second wavelength-shifting light-guides 14, 16 are placed in loose contact (i.e., loose optical contact) with the first, second and third conversion screens 8, 12, 10 so that optical photons from the phosphor material in the conversion screens are readily coupled into the first and second wavelength-shifting light-guides 14, 16. Each of the conversion screens in this example are in loose contact and not bonded contact with the wavelength-shifting light-guides such that they do not significantly disrupt total internal reflection processes within the wavelength-shifting light-guides.

The role of the conversion layers $8b$, $12b$, $10b$ of the conversion screens 8, 12, 10 is to convert incident neutrons into light. Thus, a neutron incident on the spectrometer 2 may be absorbed by the neutron absorbing material in one of the conversion screens by interacting with one of the $^6$Li nuclei. This reaction ($^6Li_3 + {}^1n_0 \rightarrow {}^3H_1 + {}^4\alpha_2 + 4.78$ MeV) results in reaction fragments that readily excite the intermixed phosphor ZnS(Ag), causing it to radiate photons. These photons may be referred to as neutron interaction photons and follow the emission spectrum of the ZnS(Ag) phosphor, which has a peak at a wavelength of around 450 nm. The neutron interaction photons are emitted in all directions. Since the conversion layer is relatively thin, for most interaction sites the light-guides present a solid angle of around $2\pi$ such that close to half of the phosphor (or luminescent) photons from the neutron interaction that escape the conversion layer of one of the conversion screens enter the respective light-guides directly. Furthermore, there is a high chance that many of the remaining half of photons from the phosphor material (i.e. those initially travelling away from the respective light-guides) will also enter the respective light-guides following reflection from the associated substrate. Thus a relatively large fraction of the neutron-induced photons from the phosphor material enter the respective light-guides.

FIGS. 2A to 2D illustrate four neutrons having different energies interacting with the spectrometer 2 shown in FIG. 1A. It will be understood that the wavelength-shifting light-guides 14, 16 will also form moderators for moderating incident neutrons energetic enough to reach these layers.

Figure 2A:
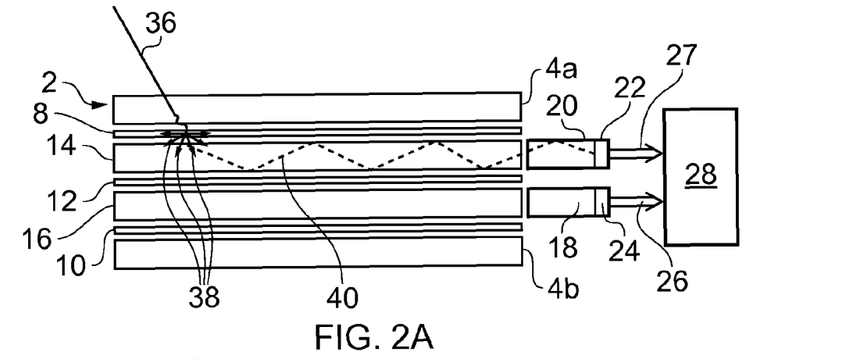
FIGS. 2A to 2D schematically show side views of the neutron spectrometer and schematically represent neutron interactions at different energies.

In FIG. 2A, a neutron 36 having a relatively low energy, is rapidly thermalised in the first moderating layer $4a$ and interacts in the first conversion screen 8. In this example, the neutron 36 is slowed sufficiently in the moderator layer $4a$ such that when the neutron 36 exits from the moderator layer $4a$ it will interact with the first conversion screen 8. In the first conversion screen 8, the neutron 36 is absorbed by the neutron absorbing material by interacting with one of the $^6$Li nuclei. The reaction results in reaction fragments that readily excite the intermixed phosphor ZnS(Ag), causing it to radiate photons 38. In general, the initial directions of the photons 38 entering the first light-guide 14 will be such that the majority of these photons would not be efficiently guided to the first photodetector 22 via the optical coupler 20 (e.g., because they enter at too steep an angle). However, the wavelength-shifting nature of the first light-guide 14 means the photons from the phosphor material 38 from the ZnS(Ag) phosphor intermixed with the neutron-absorbing LiF in the first conversion screen 8 may be absorbed in the first light-guide 14 and corresponding longer-wavelength photons re-emitted. Significantly, however, the wave-length shifted photons will be emitted over a broad range of directions (i.e. omni-directional) such that a higher number will be efficiently guided to the first photodetector 22 for detection than would be the case for the photons from the phosphor material 38 in a non-wavelength shifting light-guide. Therefore, because of the efficient wavelength-shifting characteristics of the first light-guide 14, a fraction (~30%) of the omni-directional wave-length shifted photons enter the first light-guide 14 and are ducted towards the first photodetector 22 along the first light-guide 14 as schematically shown by the dotted line 40 in FIG. 2A. The photons are detected at the first photodetector 22, and a corresponding output signal 27 is generated in the usual way. The output signals are passed to the processor 28 for processing as discussed further below.

Furthermore, in this example the first conversion screen 8 comprises a substrate $8a$ having a reflective surface. The reflective surface of the substrate may increase the number of photons entering the first light-guide 14.

Figure 2B:
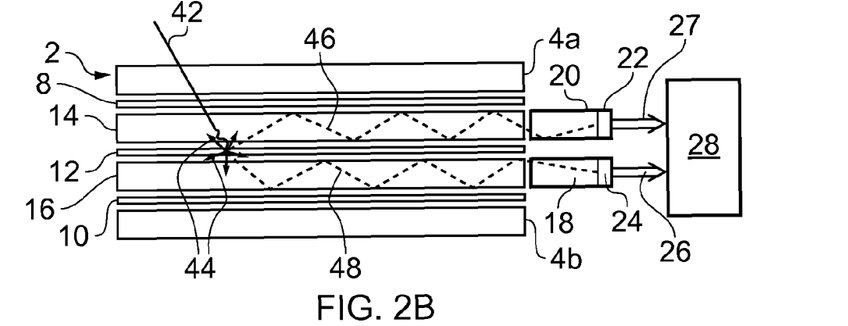

In FIG. 2B, a neutron 42 having moderate energy (e.g., more energy than neutron 36) passes through the first moderator layer $4a$ and is thermalised in the first light-guide 14. As the neutron 42 passes through each "moderator" layer it will lose energy. Thus in this example neutron 42 has sufficient energy to pass through moderator layer $4a$, and moderator layer 14 (i.e., the first wavelength-shifting light-guide 14), such that when the neutron 42 exits the moderator layer 14 it will interact with the second conversion screen 12. However, it will be appreciated that the neutron 42 may also be backscattered into the first conversion screen 8. Since the second conversion screen 12 comprises a translucent substrate $12a$, the photons 44 from the neutron interaction in the second conversion screen 12 will enter and be wavelength-shifted in the first and second light-guides 14, 16. The translucent substrate $12a$ is typically a polyester film (e.g., Mylar or Melinex) so that photons from a scintillation event in the second conversion screen 12 can enter the first and second light-guides 14, 16. The radiated photons 44 enter the first light-guide 14 and second light-guide 16, and after being wavelength shifted are guided along the respective light-guides, as schematically shown by dotted-lines 46, 48. The photons are detected at the first and second photodetectors 22, 24, and corresponding output signals 27, 26 are generated in the usual way. The output signals are passed to the processor 28 for processing. Thus a signal will be simultaneously generated in both the first and second photodetectors 22, 24 from the neutron 42.

Figure 2C:
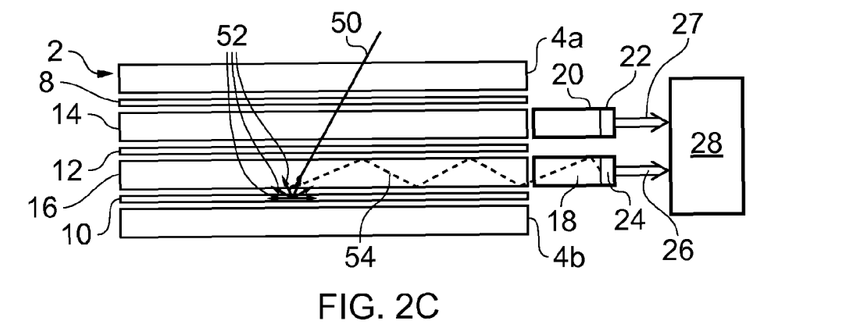

In FIG. 2C, a neutron 50 having intermediate energy (e.g., more energy than neutron 42) has sufficient energy to pass through moderator layer $4a$, moderator layer 14 (i.e., the first wavelength-shifting light-guide 14), and moderator layer 16 (i.e., the second wavelength-shifting light-guide 16), such that when the neutron 50 exits the moderator layer 16 it will interact with the third conversion screen 10 and photons 52 are radiated from the third conversion layer 10. The radiated photons 52 enter the second light-guide 16 and after being wavelength shifted are guided along the second light-guide 16, as schematically shown by dotted-line 54. The photons are detected at the second photodetector 24, and a corresponding output signal 26 is generated in the usual way. The output signals are passed to the processor 28 for processing.

Figure 2D:
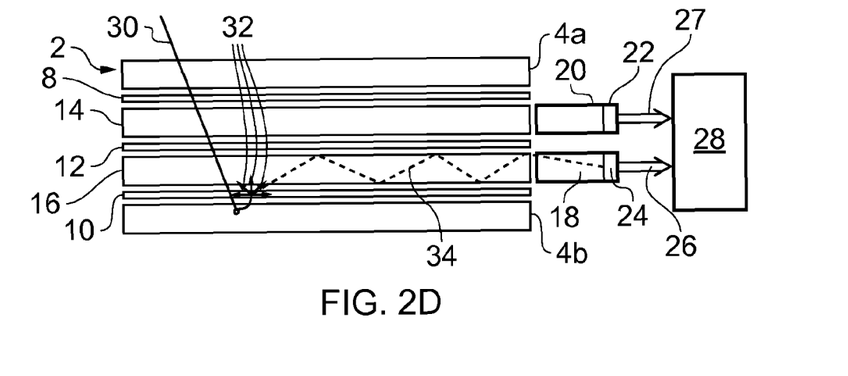

In FIG. 2D, an energetic neutron 30 travels through the HDPE layer $4a$ and the first and second wavelength-shifting light guides 14, 16, and is thermalised in the HDPE layer $4b$. In the HDPE layer $4b$, the neutron 30 backscatters into the third conversion screen 10. In this example the third conversion screen 10 comprises a substrate $10a$ having a reflective surface. The reflective surface of the substrate may increase the number of photons entering the second light-guide 16.

The wavelength shifted photons which are guided along the second light guide 16, e.g. by total internal reflection at the surfaces of the light-guide 16, as schematically shown by dotted-line 34, are detected at the second photodetector 24, and a corresponding output signal 26 is generated in the usual way. The output signals are passed to the processor 28 for processing.

In the processor 28, the signals from each of the photodetectors 22, 24 may be compared with a threshold signal. If an output signal is greater than the threshold, it may thus be assumed that the corresponding energy deposited in the detector is sufficiently high that it is to be assumed that a neutron detection event has occurred. In this way, the number of output signal pulses meeting the threshold detection test in a measurement period provides an indication of the neutron flux to which the detector is exposed during that period. By comparing the output signals to a threshold a neutron event can be reliably identified amidst the background events caused by gamma-ray interactions in the conversion screens and the wavelength-shifting light-guides. The time of arrival of a neutron can be determined using this system with a precision of ~1 microsecond. This provides sufficient resolving power to ensure that both photo-detectors can detect an event that occurs in the second conversion screen 12.

The total number of events attributed to each neutron detection screen provides an indication of the neutron flux incident on the detector during an observation period. By comparing the relative number of the events which occur in each conversion screen it is possible to derive spectroscopic information related to the incident neutron flux. For example, a graph may be plotted of the ratio of the number of events that occur in the first conversion screen 12 to the total number of events, against the ratio of the number of events detected in the second conversion screen 8 to the total number of events.

In the present example, three conversion screens are used. Therefore, it is possible to determine the number of neutron events occurring in the first conversion screen 8 by the number of neutrons events detected by the first photodetector 22, the number of neutron events occurring in the second conversion screen 12 by the number of neutron events detected simultaneously in the first and second photodetectors 22, 24 and the number of neutron events occurring in the third conversion screen 10 by the number of neutron events detected by the second photodetector 24.

To illustrate how the spectrometer 2 shown in FIG. 1A may be used to identify the nature of a neutron source, the spectrometer 2 has been simulated. In the simulation the spectrometer 2 comprises an upper polyethylene moderator (moderator 4a in FIG. 1A) having a thickness of 40 mm, a first PVT light-guide/moderator having a thickness of 45 mm (light-guide 14 in FIG. 1A), a second PVT light guide having a thickness of 20 mm (light-guide 16 in FIG. 1A) and a lower polyethylene moderator having a thickness of 30 mm (moderator 4b in FIG. 1A). The overall size of the spectrometer is 400 mm wide by 1700 mm long. Each of the conversion screens has a thickness of 1 mm in the simulation (conversion screens 8, 12, 10 in FIG. 1A).

Figure 3:
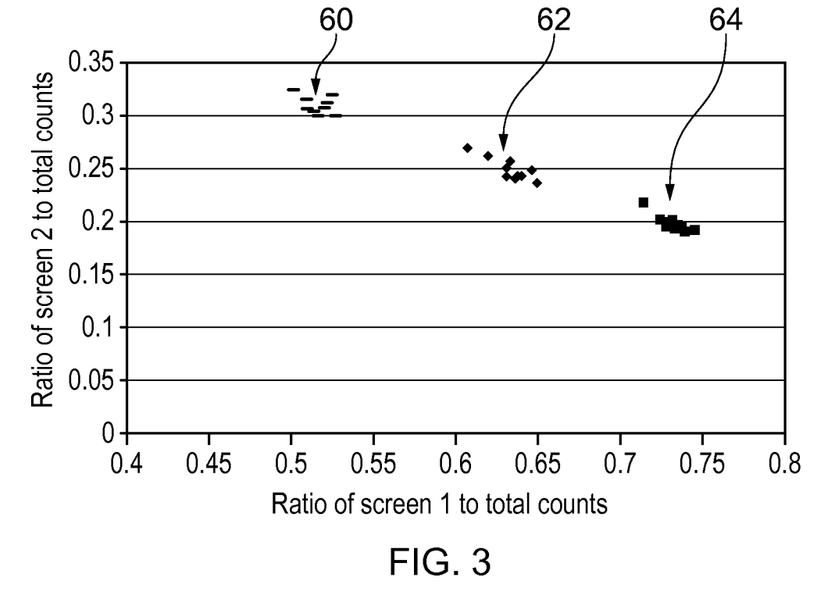
FIG. 3 schematically shows a graph of the ratio of the number of counts detected in a second conversion screen to the total number of counts against the ratio of the number of counts detected in a first conversion screen to the total number of counts from a simulation based on tracking 10,000 neutrons from three different neutron sources.

FIG. 3 shows a graph of the simulation results for the spectrometer 2. The graph shows the ratio of the number of neutron events detected in the second conversion screen 12 to the total number of neutron events (Y-axis) against the ratio of the number of neutron events detected in the first conversion screen 8 to the total number of neutron events (X-axis). As discussed above, the number of neutron events occurring in the second conversion screen 12 is determined by the number of neutron events detected simultaneously in the first and second photodetectors 22, 24 and the number of neutron events occurring in the first conversion screen 8 is determined by the number of neutron events detected by the first photodetector 22. It will be understood that the neutrons detected in the second conversion screen 12 will have higher energy than the neutrons detected in the first conversion screen 8, because the neutrons detected in the second conversion screen 12 have had to pass through two moderator layers before becoming thermalised. Three different types of neutron source are simulated, which are AmLi (squares 64), neutrons generated from a source produced through nuclear fission such as Californium-Cf (diamonds 62) and PuBe (horizontal lines 60). The graph in FIG. 3 is a simulation of the interactions of a total of 10,000 neutrons from each of the three sources. Each of the neutron sources is shown as having a distinct group of points on the graph shown in FIG. 3. Therefore, by calibrating the detector, it will be possible to determine the source of the neutrons by the location of the group of points on the graph.

As shown in FIG. 3, events from two common radioactive neutron sources and those from a typical fission source, occupy different, easily distinguishable regions of this graph.

It will be understood that prior to using the spectrometer, a calibration process may be carried out. The calibration process may involve detecting the number of neutron events occurring in each of the first, second and third conversion screens for a number of known neutron sources in isolation. The number of counts detected in each of the first, second and third conversion screens 8, 12, 10 is then used to determine the ratio between the number of neutron events.

FIG. 3 demonstrates that it is possible to distinguish between different neutron sources using the spectrometer arrangement shown in FIGS. 1A and 1B. The low energy source of AmLi (as shown in FIG. 5 by line 80) has more counts in the first conversion screen 8 ("screen 1") than in second conversion screen 12 ("screen 2"), hence the group of points 64 in the graph shown in FIG. 3 is in the bottom right of the graph. This is because the majority of the neutrons will be thermalised in the first moderator layer (moderator 4a in FIG. 1A) of the spectrometer and will interact with the first conversion screen (conversion screen 8 in FIG. 1A).

The $^{252}$Cf neutron energy source generates a neutron spectra that extends to higher energies than the AmLi source, as shown in FIG. 5 by line 84. Therefore, in the graph shown in FIG. 3, the $^{252}$Cf source has a lower count in the first conversion screen 8 and a higher count in the second conversion screen 12 than for AmLi. This is illustrated by the group of points 62 in the graph shown in FIG. 3. This is because more neutrons will be thermalised in the second and third moderator layers (first and second light-guides/moderator layers 14, 16 in FIG. 1A), than for AmLi.

The high energy PuBe source (as shown in FIG. 5 by line 82) has an increased number of counts in the second conversion screen 12 and lower number of counts in the first conversion screen 8 than for AmLi or $^{252}$Cf. This is illustrated by the group of points 60 located in the top left of the graph shown in FIG. 3. This is because fewer neutrons will be thermalised in the first moderator layer and a greater number of neutrons will be thermalised in the second and third moderators layers (first and second light-guides/moderator layers 14, 16 in FIG. 1A) and the fourth moderator layer (moderator 4b FIG. 1A).

Figure 4:
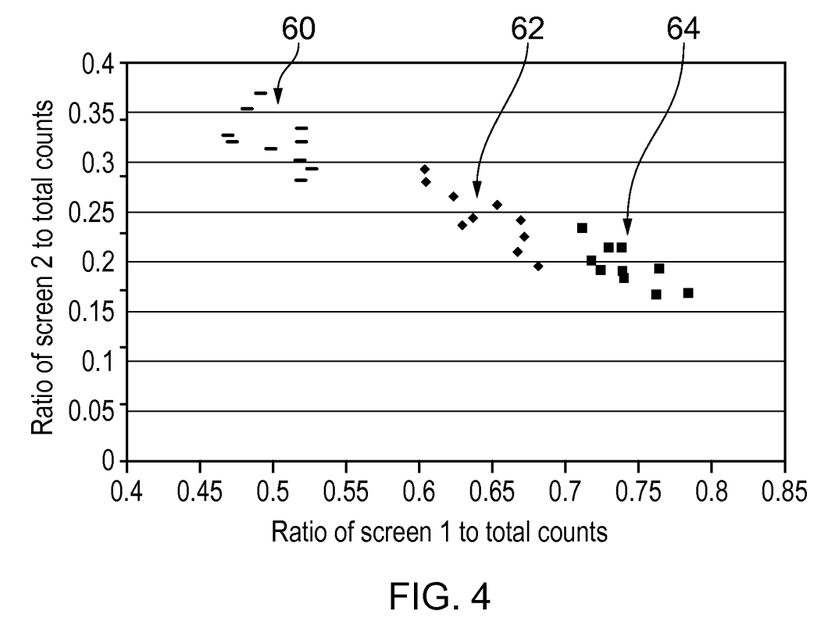
FIG. 4 schematically shows a graph of the ratio of the number of counts detected in a second conversion screen to the total number of counts against the ratio of the number of counts detected in a first conversion screen to the total number of counts from a simulation based on tracking 1000 neutrons from three different neutron sources.

FIG. 4 shows similar data spectra to that shown in FIG. 3. However, only 1000 neutrons were simulated in the example shown in FIG. 4. The same reference numerals are used in FIG. 4 to identify the three different sources as those used in FIG. 3. In a portal monitor situation, the sensitivity requirement for neutron detection is such that a neutron source generated through nuclear fission (e.g., Californium-252) having an intensity of $2 \times 10^4$ neutrons, should be detected in a vehicle passing through the portal at 5 mph. In an example, a portal panel is formed with four similar spectrometers as those shown in FIG. 1A. Four such portal panels (including four similar spectrometers) might be used at a border crossing. Therefore, the total number of neutrons entering the detectors as a vehicle passes through the portals at 5 mph would be around 1,200. Accordingly, it would be possible to identify different neutron sources using the spectrometer, since according to the simulation result shown in FIG. 4 it is possible to distinguish between different neutron sources with an intensity of 1000 neutrons per neutron source.

The sensitive area of the neutron spectrometer can be scaled to form larger spectrometers by using a multiple number of the spectrometers shown in FIG. 1, or smaller sizes (e.g., 500×50×20 mm) by reducing the dimensions of the spectrometer. Therefore, large portal detectors can be formed by mounting a number of detector modules side-by-side so as to form a modular array. Thus large detectors may be constructed to detect and identify special nuclear material at large stand-off distances, or used to survey a locality using a vehicle-mounted system, for example. Accordingly, neutron spectrometers having a sensitive area of, for example, more than a few square meters can readily be produced. Since the background count-rate in a typical implementation is approximately 10 to 20 counts/m$^2$/s, and the attenuation of a neutron source in air is small (the mean-free-path in air for 7 MeV neutrons is typically approximately 100 m) it can be possible to detect a plutonium-based nuclear weapon at a distance of 100 m in an observation period of a few minutes.

A large-area detection plane provided by a modular array of spectrometers (such as the example shown in FIGS. 1A and 1B) arranged side-by-side provides a degree of 1-D position sensitivity. Thus in some examples, a modular array of spectrometers may be combined with a linear coded mask to provide imaging information regarding the location of a source of neutrons. The mask elements used in such a linear coded mask may be designed to modulate the incident neutron flux sufficiently to enable a 1-D image to be created based on the use of standard coded aperture mask techniques [3, 4].

It will be appreciated that regardless of the number of moderator layers, some neutrons may still be too energetic and so pass through the spectrometer. However, the significance of this can be reduced by increasing the thickness of the moderator layers (including the light-guides), or by the addition of further moderator layers, either passive (e.g., HDPE sheets) or PVT light-guides. It may also be necessary to add further conversion screens. A neutron spectrometer may be constructed using more than three active detection screens based on the principles described above. In that case, the relative number of events detected in each active plane provides a measure of the incident neutron energy. By using a larger number of screens the spectrometer may provide an improved energy-resolution.

Similarly, it will be appreciated that depending on the requirements of the spectrometer, it may not be necessary to include all the elements shown in FIG. 1A. For example, in the spectrometer shown in FIG. 1A, it may not be necessary to include the HDPE moderator cover 4, or the third (or lower) conversion screen 10.

In an alternative embodiment, the PVT light-guides may be replaced by an HDPE plank or sheet and the HDPE screens are viewed using an array or ribbon of wavelength-shifting fibres. Thus the HDPE is used in alternative embodiments as a moderating material, in between each of the conversion layers, and the light is coupled in respective wavelength-shifting fibres.

In further alternative embodiments, the moderating covering illustrated in FIG. 1A as being HDPE, may be replaced with PVT scintillating material.

In examples, a detector including a conversion screen (or neutron detection screen) may be loosely coupled to a wavelength-shifting plastic light-guide. The wavelength-shifting plastic light-guide converts the wavelength of the scintillation light produced in the ZnS so that a large fraction of the wavelength-shifted light reaches a photodetector coupled to the wavelength-shifting light-guide. The material used for wavelength-shifting plastic light-guide is typically polyvinyltoluene, which moderates neutrons. Therefore, a stack of such detectors can be arranged with a read-out system. Additionally, the detectors may be interleaved with additional passive moderating material such as polyethylene. The number of read-out channels may be reduced by using a translucent neutron conversion screen between successive wavelength-shifting light guides. By combining the signals from adjacent detectors, it is possible to determine in which conversion screen a neutron incident on the detectors interacted by using known coincidence logic.

REFERENCES

[1] EP 1 749 220 (Symetrica Limited)
[2] EP 2 019 974 (Symetrica Limited)
[3] E. Fenimore & T. M. Cannon, Applied Optics, Vol 17 No 2, p 337, 1978
[4] E. Fenimore, Applied Optics, Vol 17 No 22, p 3562, 1978

The invention claimed is:

1. A neutron spectrometer comprising:
 a first conversion screen comprising a neutron absorbing material and a phosphor material;
 a first wavelength-shifting light-guide arranged to receive photons from the phosphor material of the first conversion screen and generate wavelength-shifted photons therefrom;
 a first photodetector optically coupled to the first wavelength-shifting light-guide and arranged to detect the wavelength-shifted photons from the first wavelength-shifting light-guide;
 a second conversion screen comprising a neutron absorbing material and a phosphor material;
 a second wavelength-shifting light-guide arranged to receive photons from the phosphor material of the second conversion screen and generate wavelength-shifted photons therefrom;
 a second photodetector optically coupled to the second wavelength-shifting light-guide and arranged to detect the wavelength-shifted photons from the second wavelength-shifting light-guide; and
 a processor arranged to receive signals output from each of the photodetectors and further arranged to determine respective numbers of neutron events that occur in each of the conversion screens;
 wherein the neutron spectrometer further comprises a neutron moderator material arranged between the first and second conversion screens to moderate neutrons; and
 wherein the processor is arranged to determine a ratio between the number of neutron events that occur in the first conversion screen and the number of neutron events that occur in the second conversion screen to obtain an indication of the neutron source from the relative number of neutron events detected in the first and second conversion screens.

2. The neutron spectrometer according to claim 1, wherein the neutron moderator material comprises the first wavelength-shifting light-guide.

3. The neutron spectrometer according to claim 1, wherein the neutron moderator material comprises a separate layer of neutron moderator material.

4. The neutron spectrometer according to claim 1, wherein each of the first and second conversion screens comprise a substrate having the neutron absorbing material and the phosphor material in a powdered form in a binding material thereon.

5. The neutron spectrometer according to claim 4, wherein the substrate of the first and/or second conversion screen is transparent for wavelengths in the region of the peak emission wavelength of the phosphor material.

6. The neutron spectrometer according to claim 1, wherein the first and/or second wavelength-shifting light-guide comprises an array of optical fibres.

7. The neutron spectrometer according to claim 1, comprising a layer of neutron moderating material arranged to moderate neutrons prior to interaction with the first and second conversion screens.

8. The neutron spectrometer according to claim 1, comprising a third conversion screen comprising a neutron absorbing material and a phosphor material; wherein the second wavelength-shifting light-guide is arranged to receive photons from the phosphor material of the third conversion screen and generate wavelength-shifted photons therefrom.

9. The neutron spectrometer according to claim 1, wherein the conversion screens and wavelength-shifting light-guides are in the form of adjacent planar layers.

10. The neutron spectrometer according to claim 1, wherein the respective conversion screens and wavelength-shifting light-guides are in non-bonded optical contact.

* * * * *